United States Patent [19]

Player et al.

[11] Patent Number: 4,524,086

[45] Date of Patent: Jun. 18, 1985

[54] HARD BUTTERS AND COMPOSITIONS MADE THEREWITH

[75] Inventors: Kenneth W. Player, Olmsted Falls; Lonny L. Wilson, Brunswick, both of Ohio

[73] Assignee: SCM Corporation, New York, N.Y.

[21] Appl. No.: 566,094

[22] Filed: Dec. 27, 1983

[51] Int. Cl.³ .......................... A23D 5/00; A23G 3/00
[52] U.S. Cl. .................................. 426/607; 426/613; 426/660
[58] Field of Search .................... 426/607, 613, 660

[56] References Cited

U.S. PATENT DOCUMENTS

| | | |
|---|---|---|
| 2,287,838 | 6/1942 | Stanley ..................... 426/613 X |
| 2,509,414 | 5/1950 | Barsky . |
| 2,586,615 | 5/1952 | Cross . |
| 2,671,027 | 3/1954 | Cross . |
| 2,957,932 | 10/1960 | Radlove et al. . |
| 2,999,023 | 9/1961 | Babayan et al. . |
| 3,051,577 | 8/1962 | Babayan et al. . |
| 3,752,770 | 8/1973 | Buddemeyer et al. . |
| 4,006,264 | 2/1977 | Gooding ..................... 426/607 |
| 4,234,618 | 11/1980 | Jasko et al. ............... 426/613 X |
| 4,242,366 | 12/1980 | Morgan et al. . |

FOREIGN PATENT DOCUMENTS 980131 1/1965 United Kingdom .
1297579 11/1972 United Kingdom .

OTHER PUBLICATIONS

"Polyglycerol Esters", Nash/Knight, Food Engineering of May 1967, pp. 79-82.

*Primary Examiner*—Robert Yoncoskie
*Attorney, Agent, or Firm*—Richard H. Thomas

[57] ABSTRACT

The present invention relates to novel, edible lauric hard butter compositions suitable for the preparation of confectionery coatings, and particularly to a novel emulsifier ester blend found to be beneficial in improving the performance of lauric hard butters in confectionery coatings, towards obtaining unexpectedly high gloss and gloss retention.

10 Claims, No Drawings

HARD BUTTERS AND COMPOSITIONS MADE THEREWITH

TECHNICAL FIELD

The present invention relates to novel, edible lauric hard butter compositions suitable for the preparation of confectionery coatings, and particularly to a novel emulsifier ester blend found to be beneficial in improving the performance of lauric hard butters in confectionery coatings, towards obtaining unexpectedly high gloss and gloss retention.

The term "confectionery coating", or the like, as used herein is intended to mean those enrobing compositions comprising sugar, usually an added fill such as cocoa powder, and a hard butter composition, which usually contains an emulsifier.

The term "hard butter composition" as used herein is intended to mean hard butters containing from about three to about six weight percent of the emulsifier.

Lauric hard butter compositions are those which contain fats or glycerides high in lauric fatty acid content, specifically fats derived from lauric oils such as palm kernel, coconut, tucum, babassu and other nut oils. The present invention was found to be useful with both fractionated and hydrogenated lauric fats.

BACKGROUND ART

Lauric fractionated and hydrogenated hard butters have been used for some time in replacing cocoa butter in confectionery coatings. They enjoy an advantage over domestic hard butters in that their shorter chain length and high degree of saturation enable them to have good eating quality and good oxidative stability or keeping time. They normally are used as substitute or replacement fats for cocoa butter, since they have only very small tolerance, e.g., 5% maximum, for diluent fats such as cocoa butter, butterfat and chocolate liquor. Higher amounts of diluent fats are apt to induce bloom.

Normally, these hard butters have to be tempered when they are used in confectionery coatings. Tempering is a thermal process that stabilizes the crystal structure of the hard butter in the coatings, thus providing the coatings with better shelf life. It is known to add other lipoidal substances, e.g., lipoidal emulsifiers, to the hard butters to stabilize the crystal structure, alleviating the need for tempering. These emulsifiers, however, also affect the physical properties and organoleptic characteristics of the coating when they are used, and some of the properties are improved while others are degraded.

Usually, two, three, or more of the lipoidal emulsifiers may be used together, in the hope of providing a synergistic effect designed to improve most of the properties of the coating while not degrading the rest of the properties.

By way of example U.S. Pat. No. 2,586,615 teaches the value of sorbitan monostearate and polyoxyethylene sorbitan monostearate (polysorbate 60) as a bloom inhibitor in chocolate compositions containing cacao fat with or without other vegetable fats. A similar combination was found to act as an "inhibitor against dulling", as disclosed in U.S. Pat. No. 2,671,027. Prior U.S. Pat. No. 2,999,023 refers to the value of sugar esters for gloss enhancing. In the publication "Food Engineering", of May, 1967, pages 79–82, polyglycerol esters are mentioned as being useful for confectionery coatings and chocolate, to maintain gloss properties. They are also said to minimize tempering and handling problems. Specific polyglycerol esters mentioned were triglycerol monooleate and decaglycerol trishortening. British Pat. No. 1,297,579 teaches the use of polyglyerol esters in chocolate compositions to obtain aeration of such compositions. Tri- and tetraglycerol esters were mentioned as being preferred.

Glyceryl-lacto esters of fatty acids, also referred to as lactylated mono- diglycerides, have been known for some time. They are the reaction product of lactic acid and mono- diglyceride carried out in the presence of heat. Their manufacture is described in U.S. Pat. No. 2,957,932, assigned to assignees of the present application. The disclosure of this patent is incorporated by reference herein. Manufacture of these compounds is also disclosed in Barsky U.S. Pat. No. 2,509,414.

Mostly, the glyceryl-lacto esters have been used as emulsifiers for cake mixes. This is described in British Pat. No. 980,131, dated Jan. 13, 1965, and, more recently, in Morgan et al U.S. Pat. No. 4,242,366.

In Babayan et al U.S. Pat. No. 3,051,577, it is disclosed that glyceryl-lacto fatty acid esters can be added to either a hard butter or cocoa butter to give enhanced initial and permanent gloss. It is indicated in the patent that glyceryl-lacto oleate gave the best gloss results. In a coconut type fat having $C_{16}$ and $C_{18}$ type fats, the lactopalmitate was said to be best.

In Buddemeyer et al U.S. Pat. No. 3,752,770, glyceryl-lacto esters were blended with another emulsifier such as an ethoxylated monoglyceride, polysorbate 60 or propylene glycol monostearate, and found to be especially useful in baked products. Other applications mentioned include vegetable dairy products such as puddings, confections, ice cream and ice milk. No mention is made of a high sugar confection coating or of a desire to achieve high gloss and gloss retention.

In corresponding application Serial Number 439,336, assigned to assignees of the present application, it was found that a unique blend of polyglycerol ester emulsifiers gave improved gloss and gloss retention in lauric and non-lauric hard butters. By way of example, one such blend was a combination of octaglycerol monooleate and octaglycerol monostearate.

DISCLOSURE OF INVENTION

The present invention resides in the discovery that gloss, and retention of gloss, can be substantially enhanced, to an unexpected degree, in confectionery coatings containing a lauric fat, by including in the composition an emulsifier blend consisting essentially of, based on the weight of the fat, about 1.3 to about 3% of a lactylated fatty acid ester of glycerol, and about 1.3 to about 3% of a polyglycerol ester of a fatty acid having an average degree of polymerization of about 2–6, an ester hydroxyl number of about 340–410, and a polyol hydroxyl number of 970–1350; said coating composition further containing, based on the weight of the composition, about 0.2 to about 0.6% of an edible phospholipid.

Preferably, the polyglycerol ester is selected from the group consisting of triglycerol monostearate and triglycerol monoshortening, and the lactylated fatty acid ester of glycerol is selected from the group consisting of glyceryl-lacto palmitate and glyceryl-lacto stearate. A preferred phospholipid is lecithin.

The present invention also resides in the combination of a lauric fat with a gloss enhancing amount of the emulsifier blend as above stated; and in a confectionery coating containing such hard butter and emulsifier blend.

A preferred gloss enhancing amount is about 4–4.5% of the emulsifier blend, based on the weight of the lauric fat, in substantially equal proportions of each emulsifier ingredient.

The present invention is advantageous in that it provides confectionery products having a higher surface gloss than those generally heretofore obtainable, and gloss which is maintained during storage of the products. The invention is further advantageous in that it eliminates the necessity of tempering lauric fat-containing confections (tempering being conventionally employed to improve surface gloss of such confectionery products and stability) and in that it prevents loss of surface gloss in the confectionery products during storage.

BEST MODE FOR CARRYING OUT THE INVENTION AND INDUSTRIAL APPLICABILITY

Coating Composition

The present invention is particularly applicable to the preparation of confectionery coatings useful in enrobing confectionery centers, or other surfaces, applied to such centers or other surfaces from a molten state.

Confectionery coatings, as a group, consist usually of a matrix forming amount, preferably about 20% to about 40% by weight coating fat, with the remainder being principally moisture-free solids. Whereas the solids in a pastel coating may be largely sugar, a cocoa coating will have part of the sugar removed and replaced by cocoa powder, or with certain hard butters, some chocolate liquor. Milk powders, dry powdered flavoring materials, salt, lecithin, compatible flavors and colors, complete the usual hard butter coating formula.

In some cases, sweetness contributed to the flavor profile by sugar may be modified to a certain extent by the use of dry corn syrup solids or non-sweet material such as dry skim milk or whey powder. In cocoa coatings, the principal flavor is contributed by the cocoa powder, or a combination of cocoa powder and chocolate liquor if the latter is used.

Normally, the cocoa powder added to a confectionery composition will contain an amount of fat, typically about 10-12%, although most lauric hard butters are able to tolerate cocoa powders having as much as 24% fat. These percentages are not taken into consideration when stating the amount of lauric fat contained in a coating composition.

Lecithin is an ingredient common to almost all hard butter coatings, since it is a money saver. In a typical hard butter coating, inclusion of about 0.3% lecithin gives a viscosity that would otherwise require 2–3% additional hard butter. Lecithin helps combat the thickening effect of moisture picked up from centers being enrobed, and also has a slight anti-oxident effect. The amount used in the composition of the present invention is about 0–1%.

The Hard Butter

The hard butters of the present invention are those manufactured from lauric acid-type fats of palm kernel, coconut and other nut oils. These are imported oils, and as mentioned above, enjoy a basic chemical advantage over domestic fat products in that their shorter chain length and high degree of saturation enable them to have good eating quality and good oxidative stability or keeping time. Preferably, they have a Wiley Melting Point, as determined by AOCS method Cc2-38, of about 88°–120° F.

However, conventionally, lauric hard butters are poor performers in terms of gloss retention. They also are not considered to be very compatible with diluent fats such as cocoa butter and butterfat, tending to cause a drastic decrease in melting point when so mixed, presenting insufficient hardness and heat resistance, plus susceptibility to blooming.

One particular lauric hard butter useful in the present invention is Satina AB (trademark, SCM Corporation), a solvent fractionated fat derived from palm kernal oil. This hard butter has a Wiley Melting Point of about 93° F. maximum, as determined by AOCS method Cc 2-38, and an approximate solid fat index as determined by AOCS method Cd 10-57, of

| Temperature °F. | Approx. Solid Fat Index |
| --- | --- |
| 50 | 70 minimum |
| 70 | 65 minimum |
| 80 | 53 minimum |
| 92 | 2 maximum |
| 100 | 0 |

The hard butter is designed for use in pastel or chocolate flavored coatings. It provides properties which are similar to chocolate in strink, set-up, snap and edibility. When used with the emulsifier blend of the present invention, it has excellent gloss, gloss retention and resistance to bloom.

Another lauric hard butter that may be used in the practice of the present invention is Paramount B, (trademark, SCM Corporation) which is a partially hydrogenated palm kernal oil having a Wiley Melting Point in the range of about 93°–96° F., and a Solid Fat Index as follows:

| Temperature °F. | Approx. Solid Fat Index |
| --- | --- |
| 50 | 64 minimum |
| 70 | 51 minimum |
| 80 | 35 minimum |
| 92 | 6 minimum |
| 100 | 1 maximum |

As contrasted with the Satina AB, this is a partially hydrogenated palm kernel oil. Both Satina AB and Paramount B are certified for Kosher use.

The amount of hard butter employed is an effective amount, e.g., 20-40%, necessary for a confectionery coating. Specific proportions are known to those skilled in the art. For most coatings, a preferred proportion is about 30% to about 36%, based on the total weight of the composition.

Emulsifier Blend

The glyceryl-lacto ester component of the emulsifier blend is preferably supplied by a food grade glyceryl-lacto ester emulsifier prepared by known processes involving the reaction of a mono- and diglyceride concentrate with lactic acid. The lacto palmitates are preferred, but the lacto stearates are also satisfactory, and may be used alone or in admixture with the lacto palmitate. Lactic acid has both a hydroxyl and carboxyl group in its molecule and readily forms a condensation polymer with an adjoining lactic acid. The commercial glyceryl-lacto ester emulsifier therefore contains variable amounts of polymerized lactic acid of variable chain lengths.

For purposes of the present application, the terms glyceryl-lacto ester and lactylated mono-diglyceride may be deemed synonymous.

One particularly useful such emulsifier, for the present invention, is marketed under the trademark Durlac 100 (SCM Corporation), which has at least 13% water insoluble combined lactic acid (WICLA) and no more than 6-10% alpha monoglyceride. This emulsifier has a Capillary Melting Point of about 115°-130° F.

The method for preparing the glyceryl-lacto ester is described in U.S. Pat. No. 2,957,932, assigned to assignee of the present application. The disclosure of this patent is incorporated by reference herein. Specifically, the method involves heating a mixture of one molar proportion of glycerine, one molar proportion of higher fatty acid having from 12 to 20 carbon atoms and at least 1.75, but not more than 3, molar proportions of a monohydroxy monocarboxylic acid at about 185° C. Most conveniently, the reaction is carried out under refluxing conditions adapted to remove the water formed in the esterification reaction and to permit the return to the mixture of the monohydroxy carboxylic acid if such is volatile to an appreciable extent during the reaction. Preferably, the fatty acid, as indicated, is selected to consist of at least about 50% palmitic acid, and the monohydroxy monocarboxylic acid is lactic acid.

The polyglycerol component of the present invention is one having an average degree of polymerization of about 2-6, an ester hydroxyl number of about 340-410 and a polyol hydroxyl number of about 970-1350. A particular such polyglycerol ester is triglycerol mono stearate, marketed under the trademark Santone 3-1-S (trademark, SCM Corporation). This polyglycerol ester has a saponification value of about 115-135, a Mettler Dropping Point of about 52°-55° C. an IV of about 0.5, an acid value of about 8 max. and an HLB value of about 7.2.

The hydroxyl number (polyol or ester) is an indication of the number of free hydroxyl groups present in either the polyglycerol or the ester and is the number of miligrams of potassium hydroxide equivalent to the hydroxyl content of one gram of sample. The hydroxyl number and average degree of polymerization best characterize the polyglycerol ester compounds of the present invention. The degree of polymerization is obtained by correlation with the hydroxyl number, following standard procedures.

Broadly, the polyglycerol esters of the present invention are a mixture of unsaturated and saturated fatty acid esters of a mixture of polyglycerols, in which the range of polyglycerol is from diglycerol to hexaglycerol. The unsaturated and saturated fatty acids generally contain 16 to 18 carbon atoms and are typically derived from corn oil, cottonseed oil, lard, palm oil, peanut oil, safflower oil, sesame oil, soybean oil, tallow, and tall oil, and the fatty acid derived from these substances is either hydrogenated or unhydrogenated. The polyglycerol mixture is prepared by the polymerization of glycerol with an alkaline catalyst, as exemplified in U.S. Pat. No. 3,367,774, or an acid catalyst as exemplified in U.S. Pat. No. 3,968,169. The esters are then obtained by esterifying the polymerized glycerol with fatty acids either in a direct esterification process or by reaction with fats and oils in an interesterification process.

In the practice of the present invention, the amount of emulsifier blend employed in broadly in the range of about 2.6-6%, preferably in the range of about 4-4.5%, based on the weight of hard butter employed. With the use of about 33% hard butter, the preferred amount works out to be about 1.4% emulsifier blend, plus or minus, based on the weight of the entire composition.

Preferably, equal proportions of the emulsifier components are employed in the blend, although this proportion can vary within the range of about 30:70 to 70:30, preferably about 40:60 to 60:40.

With less than about 30%, either emulsifier, the advantages of the present invention are not fully realized.

It should be noted that the amount of about 0.7% (basis total composition) of either emulsifier, particularly of the polyglycerol ester, is a non-aerating amount. In the practice of the present invention, as will be subsequently described, the coating compositions are conched, prior to enrobing, at about 125° F. under low shear conditions, enough to maintain the mix in suspension. Higher speed mixing, with a larger amount of polyglycerol ester, e.g., 4-6%, could cause aeration. In the practice of the present invention, surprisingly, an effective amount of the polyglycerol ester is far less than an aerating amount.

Processing Conditions

In the practice of the present invention, the ester emulsifier blend can be added directly to a molten mix of the confectionery composition ingredients, or alternatively, can be incorporated into the fat or hard butter and added as a part of the fat or hard butter ingredient. Preferably, the emulsifier blend is a part of the fat or hard butter ingredient.

For optimum gloss, it is important for the dry particles to have an average particles size less than about 50 microns. Initially, thus, the dry mix ingredients may be passed through an atomizing pulverizer dry grinder, usually of the air classification type. This type of grinder can be adjusted so that the air stream leaving it will only carry the fine particles that are suitable for making a smooth coating. The size and shape of the sugar particles, in particular, have an effect on the coating. Preferably, the particle size is reduced to below about 50 microns. Otherwise, the coating may seem gritty in comparison. If the sugar is ground to too fine a particle size, the coating may require more hard butter to cover the increase in surface area and provide lubricity and low viscosity.

Regardless of whether the sugar and other particulate ingredients such as the cocoa and non fat dry milk are subjected to particle size reduction, the coating composition, following admixture of the ingredients thereof, is preferably subjected to refining at an reduced temperature of about 80°-90° F., by passing the mixture through a 3 or 5 roll refiner mill. These roller mills represent the classic method of reducing particles that can be fragmentized in a fat-suspended state. Following refining, the coating is conched at about 125° for about 1-7 hours, prior to enrobing. Conching is a low shear mixing step which allows proper flavor development, moisture reduction and coating quality improvement.

From the conching tank, the coating materials are preferably cooled, either in transit or in a small surge tank, near the enrober, to a point 2 to 5 degrees above the Wiley Melting Point of the hard butter, and then applied, with no mushing or seeding being involved.

It is a feature of the present invention that, following application of the coating to a substrate, tempering need not be practiced.

EXAMPLES 1-4

The following coating compositions were prepared.

| Ingredients | Example 1 | Example 2 | Example 3 | Example 4 |
|---|---|---|---|---|
| Sugar | 53.17 | 53.17 | 53.17 | 53.17 |
| Satina AB | 34.60 | 33.90 | 33.20 | 32.90 |
| Natural cocoa | 11.70 | 11.70 | 11.70 | 11.70 |
| Durlac 100 | — | 0.70 | 0.70 | 0.70 |
| Santone 3-1-5 | — | — | 0.70 | 1.00 |
| Lecithin | 0.40 | 0.40 | 0.40 | 0.40 |
| Salt | 0.09 | 0.09 | 0.09 | 0.09 |
| Methyl vanillan | 0.04 | 0.04 | 0.04 | 0.04 |
|  | 100% | 100% | 100% | 100% |

The coatings were prepared by first melting the emulisifer components into the hard butter at about 150°, and then adding the dry mix ingredients to the lipid blend. The compositions were then refined under conventional confectionery refining procedures, following which they were conched at about 125° F. for 1-2 hours. Enrobing took place at about 105° F.

The coatings were checked following cooling for initial gloss and were subjected to cycling conditions and tested for fat bloom and gloss retention. The following results were obtained:

TABLE I

| Example | Bloom | Initial Gloss | Gloss Retention |
|---|---|---|---|
| 1 | spotty fat bloom after 7 days' storage | good | fair |
| 2 | spotty fat bloom after 14 days' storage | good | fair |
| 3 | no bloom after 131 days storage | excellent | good |
| 4 | no bloom after extended storage | excellent | good |

From the above data, it can be seen that under cycling conditions, the coatings which incorporate both Durlac 100 and polyglycerol ester emulsifier have significantly greater shelf life and gloss retention to a degree of about 6 power, compared with Example 1 with no emulsifier or Example 2 with only glyceryl-lacto ester emulsifier.

We claim:

1. A confectionery coating composition of exceptional gloss and gloss retention, comprising sugar, a lauric hard butter and an ester emulsifier blend, said ester emulsifier blend being present in the amount of abouot 2.6–6%, based on the weight on the hard butter, the improvement comprising an emulsifier blend consisting essentially of about 1.3–3% lactylated fatty acid ester of glycerol and about 1.3–3% polyglycerol ester of a fatty acid having an average degree of polymerization of about 2–6, an ester hydroxyl number of about 340–410, and a polyol hydroxyl number of about 970–1350.

2. The coating composition of claim 1 wherein said lactylated fatty acid ester and polyglycerol ester are present in the proportion of about 30:70–70:30 lactylated ester to polyglycerol ester.

3. The coating composition of claim 1 wherein said emulsifier blend comprises approximately equal proportions of glyceryl-lacto ester and polyglycerol ester.

4. The coating composition of claim 1 wherein said lactylated fatty acid ester of glycerol is selected from the group consisting of glyceryl-lacto palmitate and glyceryl-lacto stearate.

5. The coating composition of claims 1, 2, or 4, comprising about 4–4.5% emulsifier blend, based on the weight of hard butter, said hard butter being a hydrogenated or fractionated derivative of palm kernel oil or coconut oil and having a Wiley Melting Point in the range of about 88°–120° F.

6. The coating composition of claims 1, 2 or 4, further comprising about 0–1% of an edible phospholipid, based on the weight of the entire composition.

7. A confectionery coating composition of exceptional gloss and gloss retention comprising:
   a major amount of sugar;
   a matrix forming amount of a lauric hard butter having a Wiley Melting Point in the range of about 88°–120° F.;
   about 2.6–6% of an ester emulsifier blend, based on the weight of the hard butter consisting essentially of about 1.3–3% lactylated fatty acid ester of glycerol and about 1.3–3% polyglycerol ester of a fatty acid having an average degree of polymerization of about 2–6, an ester hydroxyl number of about 340–410, and a polyol hydroxyl number of about 970–1350, in the proportion of about 30:70–70:30 lactylated ester to polyglycerol ester;
   said lactylated ester being selected from the group consisting of glyceryl-lacto palmitate and glyceryl-lacto stearate; and
   about 0–1% of an edible phospholipid, basis total composition.

8. The coating composition of claim 7 comprising about 20–40% by weight lauric hard butter.

9. A confectionery coating composition of exceptional gloss and retention of gloss comprising,
   ingredients selected from the group consisting of sugar, cocoa powder, whole milk powder, non-fat dry milk and blends thereof, in effective confectionery coating amounts;
   a hard butter in a matrix forming amount having a Wiley Melting Point in the range of about 88°–120° F., said hard butter being either hydrogenated or fractionated derivative of palm kernel oil or coconut oil;
   and an emulsifier blend present in the amount of about 4–4.5% based on the weight of the hard butter, and consisting essentially of a lactylated fatty acid ester of glycerol selected from the group consisting of glyceryl-lacto palmitate and glyceryl-lacto stearate, in combination with a polyglycerol ester of a fatty acid having an average degree of polymerization of about 2–6, an ester hydroxyl number of about 340–410, and a polyol hydroxyl number of about 970–1350, in the proportion of about 30:70–70:30 lactylated ester to polyglycerol ester.

10. A hard butter composition suitable for confectionery compositions comprising a hard lauric fat which is either fractionated or hydrogenated, or both, in a major amount; and about 4–4.5%, based on the weight of the fat, of an emulsifier blend consisting essentially of:
   (a) about 40 to about 60% by weight based on the weight of the emulsifier blend of a polyglycerol ester of a fatty acid having an average degree of polymerization of about 2-6, a hydroxyl number of about 340-410, and a polyol hydroxyl number of about 970-1350; and (b) about 60 to about 40% by weight based on the weight of the emulsifier blend of a lactylated fatty acid ester of glycerol selected from the group consisting of glyceryl-lacto palmitate and glyceryl-lacto stearte.

* * * * *